(12) United States Patent
Bogachuk et al.

(10) Patent No.: US 11,325,649 B2
(45) Date of Patent: May 10, 2022

(54) SLEEVE FOR REPAIRING VEHICLE FRAME RAIL

(71) Applicant: Ford Global Technologies, LLC, Dearborn, MI (US)

(72) Inventors: Vladimir Vladimirovich Bogachuk, West Bloomfield, MI (US); Gerry Bonanni, Ypsilanti, MI (US); Ryan Smith, Fenton, MI (US); Shawn Michael Morgans, Chelsea, MI (US); Steven William Gallagher, Bloomfield Hills, MI (US); Chunhui Kevin Lee, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 176 days.

(21) Appl. No.: 16/707,174

(22) Filed: Dec. 9, 2019

(65) Prior Publication Data

US 2021/0171107 A1     Jun. 10, 2021

(51) Int. Cl.
| | |
|---|---|
| *B62D 21/15* | (2006.01) |
| *B62D 25/08* | (2006.01) |
| *B62D 29/00* | (2006.01) |
| *B60R 19/24* | (2006.01) |
| *B62D 21/02* | (2006.01) |

(52) U.S. Cl.
CPC ........... *B62D 21/152* (2013.01); *B62D 25/08* (2013.01); *B60R 19/24* (2013.01); *B62D 21/02* (2013.01); *B62D 29/008* (2013.01)

(58) Field of Classification Search
CPC .... B62D 21/152; B62D 25/08; B62D 29/008; B62D 21/02; B60R 19/24
USPC ................... 296/187.09, 187.1, 204, 193.09
See application file for complete search history.

(56) References Cited

U.S. PATENT DOCUMENTS

| | | | | |
|---|---|---|---|---|
| 5,228,182 | A * | 7/1993 | Hart ...................... | B23P 19/027 29/252 |
| 5,393,095 | A | 2/1995 | Kreis et al. | |
| 5,399,046 | A | 3/1995 | Stielau et al. | |
| 6,010,155 | A * | 1/2000 | Rinehart ................. | B62D 21/02 280/781 |
| 6,328,377 | B1 * | 12/2001 | Makita .................. | B62D 21/152 296/203.02 |
| 6,382,709 | B1 | 5/2002 | Chirifu et al. | |

FOREIGN PATENT DOCUMENTS

| | | | | |
|---|---|---|---|---|
| DE | 19633906 A1 * | 2/1998 | ............ | B62D 25/08 |
| DE | 19633906 A1 | 2/1998 | | |
| DE | 102008021076 A1 | 10/2009 | | |

\* cited by examiner

*Primary Examiner* — D Glenn Dayoan
*Assistant Examiner* — Dana D Ivey
(74) *Attorney, Agent, or Firm* — Vichit Chea; Carlson, Gaskey & Olds, P.C.

(57) ABSTRACT

This disclosure relates to a sleeve for repairing or reconstructing a frame rail of a motor vehicle. An exemplary repair sleeve includes a base wall, first and second side walls projecting from opposite sides of the base wall, and a sectioned wall including first and second sections spaced-apart from one another such that the two side walls are moveable relative to one another in a pre-installed condition.

18 Claims, 4 Drawing Sheets

SLEEVE FOR REPAIRING VEHICLE FRAME RAIL

TECHNICAL FIELD

This disclosure relates to a sleeve for repairing or reconstructing a frame rail of a motor vehicle.

BACKGROUND

Motor vehicles are known to include a front end structure providing visual appeal and functioning as an energy absorbing structure. A known front end structure includes a front bumper and front frame rails. The front frame rails extend along a length of the motor vehicle and support the front bumper.

SUMMARY

A repair sleeve for repairing a rail of a motor vehicle according to an exemplary aspect of the present disclosure includes, among other things, a base wall, first and second side walls projecting from opposite sides of the base wall, and a sectioned wall including first and second sections spaced-apart from one another such that the two side walls are moveable relative to one another in a pre-installed condition.

In a further non-limiting embodiment of the foregoing repair sleeve, the base wall, first and second side walls, and sectioned wall define a cross-sectional area substantially corresponding to a cross-sectional area of the rail.

In a further non-limiting embodiment of any of the foregoing repair sleeves, the first and second side walls include openings for receiving fasteners.

In a further non-limiting embodiment of any of the foregoing repair sleeves, the base wall includes openings for receiving fasteners.

In a further non-limiting embodiment of any of the foregoing repair sleeves, the openings in the base wall, first side wall, and second side wall are at predefined locations.

In a further non-limiting embodiment of any of the foregoing repair sleeves, the base wall, first side wall, and second side wall each include a first set of openings and a second set of openings on opposite sides of a plane bisecting the base wall, first side wall, and second side wall.

In a further non-limiting embodiment of any of the foregoing repair sleeves, the first set of openings are at locations which correspond to the locations of second set of openings reflected about the plane.

In a further non-limiting embodiment of any of the foregoing repair sleeves, adjacent openings within the first and second sets are staggered relative to one another.

In a further non-limiting embodiment of any of the foregoing repair sleeves, the repair sleeve includes a first dimension corresponding to a length of the rail, a second dimension corresponding to the height of the rail, and a third dimension corresponding to the width of the rail, and the second dimension is greater than the first and third dimensions.

In a further non-limiting embodiment of any of the foregoing repair sleeves, when in an installed condition, the first section is closer to the second section than in the pre-installed condition.

In a further non-limiting embodiment of any of the foregoing repair sleeves, the repair sleeve is integrally formed as a one-piece component.

In a further non-limiting embodiment of any of the foregoing repair sleeves, the repair sleeve is made of aluminum.

A motor vehicle according to an exemplary aspect of the present disclosure includes, among other things, a repair sleeve, a portion of an original rail, and a portion of a new rail connected to the portion of the original rail via the repair sleeve.

In a further non-limiting embodiment of the foregoing motor vehicle, the repair sleeve comprises a base wall, first and second side walls projecting from opposite sides of the base wall, and a sectioned wall including first and second sections spaced-apart from one another such that the two side walls are moveable relative to one another in a pre-installed condition.

In a further non-limiting embodiment of any of the foregoing motor vehicles, the base wall, first and second side walls, and sectioned wall define a cross-sectional area substantially corresponding to a cross-sectional area of the portion of the original rail and the portion of the new rail.

In a further non-limiting embodiment of any of the foregoing motor vehicles, the base wall, first side wall, and second side wall each include first and second sets of openings for receiving fasteners, the first and second sets of openings are opposite sides of a plane bisecting the base wall, first side wall, and second side wall, fasteners received in the first set of openings connect the repair sleeve to the portion of the original rail, and fasteners received in the second set of openings connect the repair sleeve to the portion of the new rail.

In a further non-limiting embodiment of any of the foregoing motor vehicles, the first set of openings are at locations which correspond to the locations of second set of openings reflected about the plane, and adjacent openings within the first and second sets of openings are staggered relative to one another.

A method according to an exemplary aspect of the present disclosure includes, among other things, connecting a portion of an original rail of a motor vehicle to a portion of a new rail with a repair sleeve.

In a further non-limiting embodiment of the foregoing method, the method includes arranging the repair sleeve relative to the original rail and the new rail by deflecting a wall of the repair sleeve.

In a further non-limiting embodiment of any of the foregoing methods, the method includes removing a portion of the repair sleeve so that the repair sleeve fits relative to the original rail and the new rail.

DETAILED DESCRIPTION

This disclosure relates to a sleeve for repairing or reconstructing a frame rail of a motor vehicle. An exemplary repair sleeve includes a base wall, first and second side walls projecting from opposite sides of the base wall, and a sectioned wall including first and second sections spaced-apart from one another such that the two side walls are moveable relative to one another in a pre-installed condition. The disclosed repair sleeve permits relatively inexpensive repair or reconstruction of various frame rail defects. These and other benefits will be appreciated from the following description.

Figure 1:
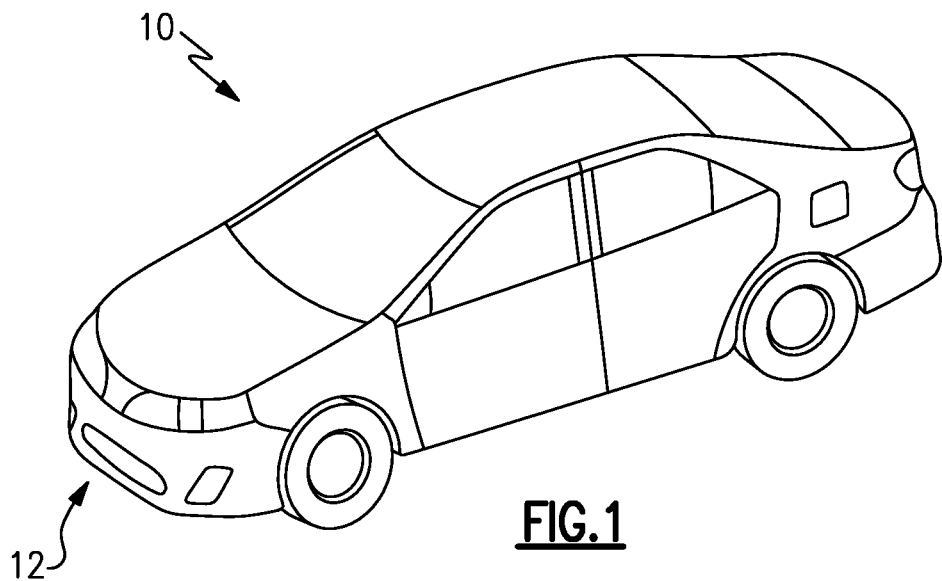
FIG. 1 illustrates an example motor vehicle.

Referring to the drawings, FIG. 1 schematically illustrates a motor vehicle 10 ("vehicle 10"), which includes a front end structure 12. In FIG. 1, the vehicle 10 is a sedan. It should be understood that this disclosure is not limited to any particular type of vehicle, and extends to trucks, vans, and sport utility vehicles (SUVs), as examples. The vehicle 10 may be an electrified vehicle or may be driven solely by an internal combustion engine.

Figure 2:
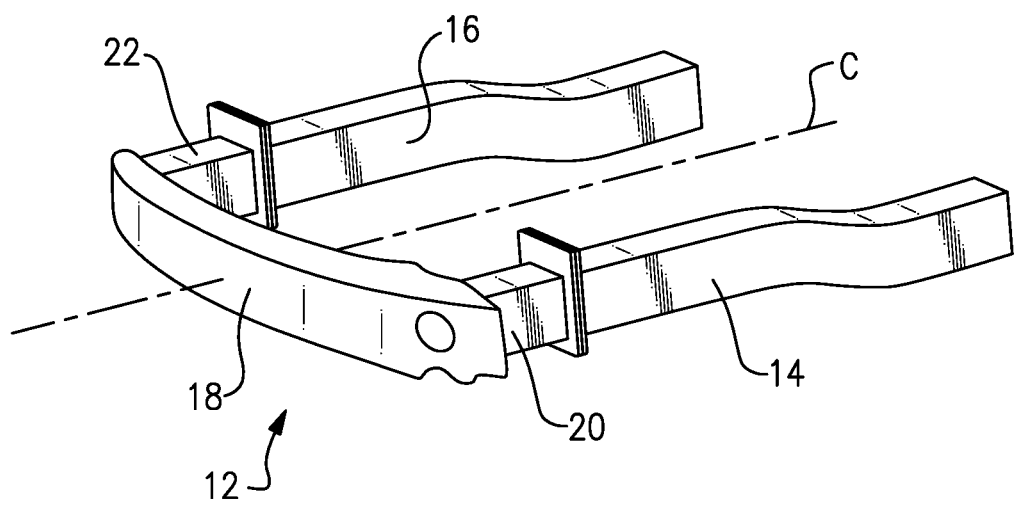
FIG. 2 illustrates an example front end structure.

The front end structure 12 is shown in more detail in FIG. 2. The front end structure 12 includes first and second front frame rails 14, 16 extending along a length of the vehicle 10 on opposite sides of a centerline C of the vehicle 10. The first and second front frame rails 14, 16 support a front bumper 18 via respective first and second boxes 20, 22. The boxes 20, 22 are configured to absorb energy in response to certain applied forces.

The first and second front frame rails 14, 16 provide a portion of a frame of the vehicle 10. The first and second front frame rails 14, 16 are an enclosed, hollow structures, and may be formed using an extrusion process. This disclosure is not limited to extruded or hollow rails, and extends to rails formed using other manufacturing techniques and with different cross-sectional profiles.

Figure 3:
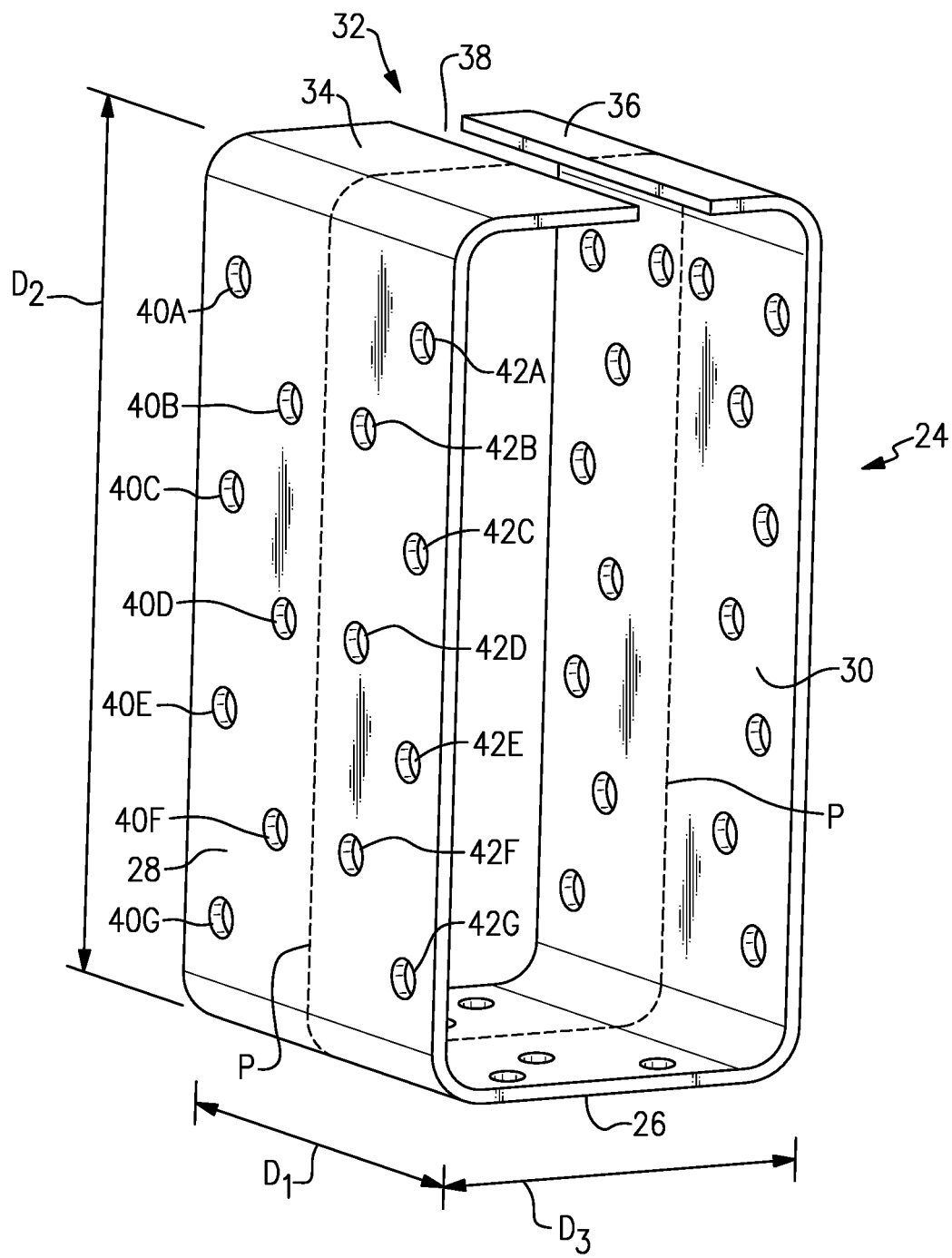
FIG. 3 is a perspective view of an example repair sleeve.

FIG. 3 illustrates a repair sleeve 24 for repairing a rail of the vehicle 10. In particular, the repair sleeve 24 may be used to repair or reconstruct the first front frame rail 14 or the second frame rail 16. To this end, the term "repair" as used relative to the repair sleeve 24 is inclusive of reconstruction. Further, the repair sleeve 24 is not limited to use in repair or reconstruction techniques for front frame rails, and can be used to repair other rails of the vehicle 10.

In the example of FIG. 3, the repair sleeve 24 includes a base wall 26 and first and second side walls 28, 30 projecting from opposite sides of the base wall 26. The repair sleeve 24 further includes a sectioned wall 32, which in this example is a top wall relative to the orientation of the repair sleeve in FIG. 3. The sectioned wall 32 first and second sections 34, 36 projecting from the first and second side walls 28, 30, respectively. The first and second sections 34, 36 are spaced-apart from one another such that the two side walls 28, 30 are moveable relative to one another in a pre-installed condition (i.e., a pre-installed orientation). In this disclosure, the pre-installed condition is a condition after the repair sleeve 24 is formed and before the repair sleeve 24 is installed relative to the vehicle 10 to repair or reconstruct a rail.

The repair sleeve 24 is formed is integrally formed as a one-piece component in this example. In particular, the base wall 26, first side wall 28, second side wall 30, and sectioned wall 32 are integrally formed with one another. The repair sleeve 24, in one example, is formed at least in part by an extrusion process. The repair sleeve 24 may be made of aluminum (Al) in one example. The repair sleeve 24 is originally formed in the pre-installed condition, in one example, such that the repair sleeve 24 is biased toward the pre-installed condition.

The repair sleeve 24 is substantially rectangular, with rounded corners in this example, in cross-section. The repair sleeve 24 includes a first dimension $D_1$ corresponding to a length of the first and second front frame rails 14, 16, a second dimension $D_2$ corresponding to the height of the first and second front frame rails 14, 16, and a third dimension $D_3$ corresponding to the width of the first and second front frame rails 14, 16. Specifically, the dimensions $D_1$-$D_3$ extend parallel to the corresponding dimensions of the frame rail, when installed relative to the rail. The second dimension $D_2$ is greater than the first and third dimensions $D_1$, $D_3$, in this example.

The repair sleeve 24 defines a cross-sectional area between the base wall 26, first and second side walls 28, 30, and sectioned wall 32 substantially matching a cross-sectional area of the first and second front frame rails 14, 16. Namely, the second dimension $D_2$ and third dimension $D_3$ substantially match corresponding dimensions of the first and second front frame rails 14, 16. In the pre-installed condition, the cross-sectional area of the repair sleeve 24 is slightly larger than the cross-sectional area of the first and second front frame rails 14, 16 to facilitate positioning of the repair sleeve 24 over the rails.

The first and second section 34, 36 are separated from one another by a gap 38 in a direction parallel to the third dimension $D_3$. The gap 38 extends along an entirety of the first dimension $D_1$ in this example such that the first and second section 34, 36 do not directly contact one another. The first and second sections 34, 36 are moveable toward and away from one another via the gap 38. The gap 38 will be discussed in more detail below.

The repair sleeve 24, in this example, includes a plurality of openings for receiving fasteners configured to attach the repair sleeve 24 to an original section of the first or second front frame rail 14, 16 and a new section of the rail, as will be discussed below. In this example, the first side wall 28, the second side wall 30, and the base wall 26 each include openings for receiving such fasteners. The openings may be provided at predefined locations to ensure a robust connection between the original section of the first or second front frame rail 14, 16 and the new section of the frame rail. The fasteners may be rivets, such as pop rivets, or another known type of fastener. The repair sleeve 24 does not include fastener openings in all examples.

In FIG. 3, the base wall 26, first side wall 28, and second side wall 30 wall each include a first set of openings and a second set of openings on opposite sides of a plane P bisecting the base wall 26, first side wall 28, and second side wall 30. The plane P is located at a mid-point of the first dimension $D_1$ and extends in a direction normal to the first dimension $D_1$.

With reference to the first side wall 28, a first set of openings 40A-40G and a second set of openings 42A-42G are on opposite sides of the plane P. Further, in this example, adjacent ones of the openings are staggered relative to one another. In particular, relative to the first set of openings 40A-40G, openings which are adjacent one another along the second dimension $D_2$ are arranged at different distances from the plane P. For instance, openings 40A, 40C, 40E, 40G are adjacent an edge of the repair sleeve 24 and are at a first distance from the plane P, while the openings 40B, 40D, 40F are adjacent the plane P and are at a second distance less than the first distance from the plane P. Staggering the openings in this manner prevents interference between fasteners without requiring an unduly large repair sleeve.

The first set of openings 40A-40G are at locations which correspond to the locations of second set of openings 42A-42G reflected about the plane P, in this example. The second side wall 30 includes a substantially similar arrangement of openings. The base wall 26 also includes a similar arrangement of openings, although the base wall 26 includes fewer openings than the first and second side walls 28, 30 given the relatively smaller surface area of the base wall 26.

Figure 4:
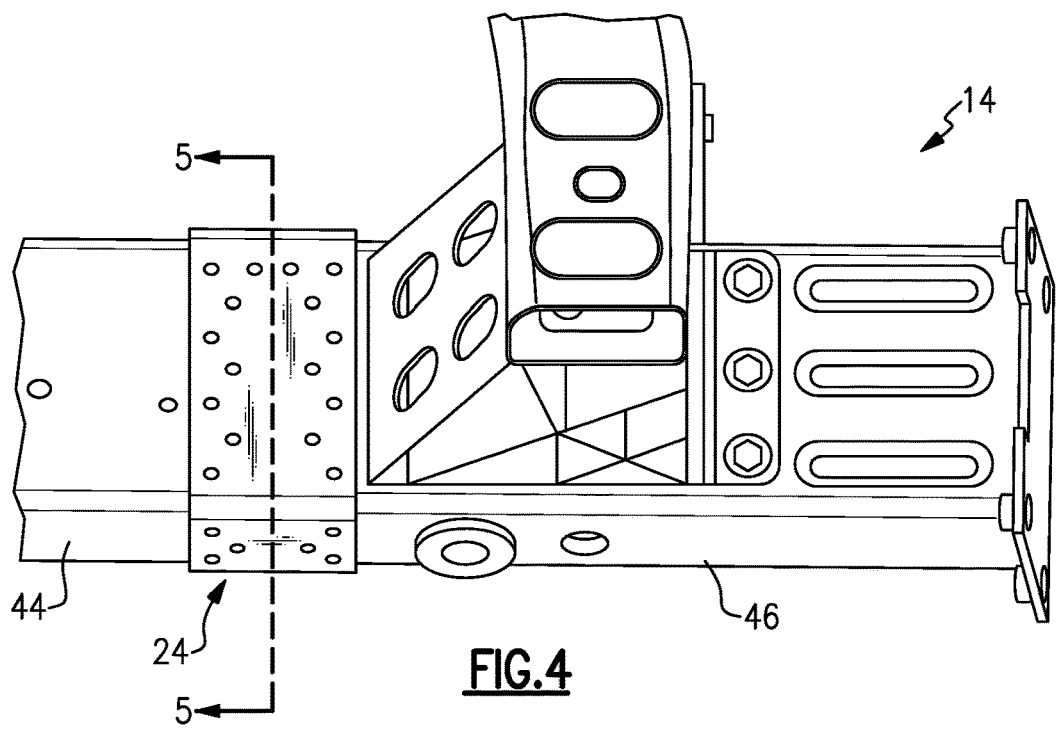
FIG. 4 illustrates a repair sleeve relative to an original portion of a rail and a new portion of a rail.

The repair sleeve 24 is used in a repair/reconstruction technique in which an original portion of one of the first and second front frame rails 14, 16 is cut and removed from the remainder of the original first or second front frame rail 14, 16. The removed portion may have been defective, for example. In FIG. 4, the front frame rail 14 has been cut, leaving an original portion 44 of the front frame rail 14. The original portion 44 is attached to a new portion 46 of the front frame rail 14, which was cut from a replacement front frame rail, for example, to match the portion of the front frame rail 14 which was removed. The repair sleeve 24 is used to connect the original portion 44 and the new portion 46. In a particular example, fasteners are inserted through the first set of openings (e.g., 40A-40G) to connect the repair sleeve 24 to the original portion 44 and additional fasteners are inserted through the second set of openings (e.g., 40A-40G) to connect the repair sleeve 24 to the new portion 46.

Figure 5:
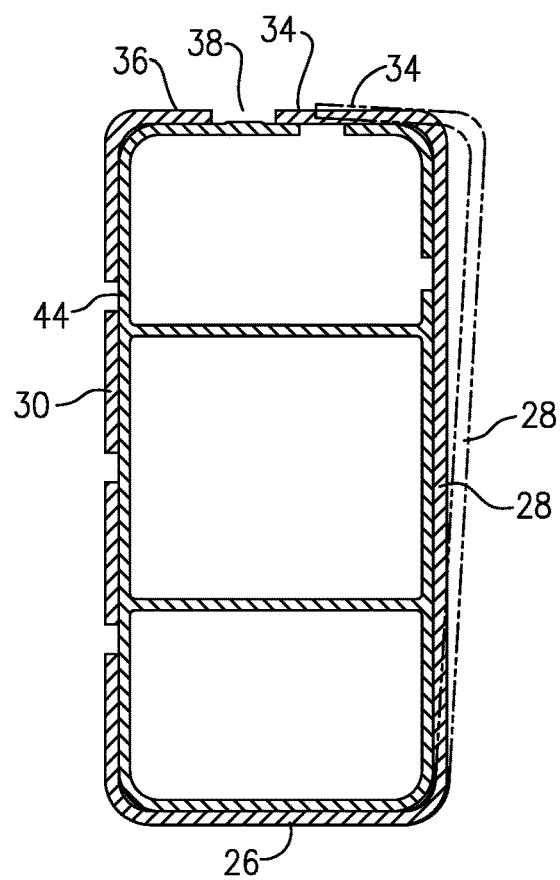
FIG. 5 is a cross-sectional view taken along line 5-5 and illustrates the repair sleeve in a pre-installed condition (phantom) and an installed condition (solid lines).

The sectioned wall 32, and in particular the gap 38, facilitates arranging the repair sleeve 24 relative to the original and new portions 44, 46. Specifically, the first and second side walls 28, 30 may be deflected relative to one another to increase the gap 38 to facilitate arrangement of the repair sleeve 24 relative to the original and new portions 44, 46. For instance, in FIG. 5, the repair sleeve 24 is illustrated relative to the original portion 44. FIG. 5 illustrates the repair sleeve 24 in the pre-installed condition (phantom) and in the installed condition (solid lines). In the pre-installed condition, the first section 34 is spaced-apart further from the second section 36 than in the installed condition, as are the first and second side walls 28, 30. The gap 38 is also larger in the pre-installed condition than in the installed condition. Further, the first section 34 and the second section 36 lie in substantially the same plane when in the installed condition and are inclined relative to one another in the pre-installed condition.

Figure 6B:
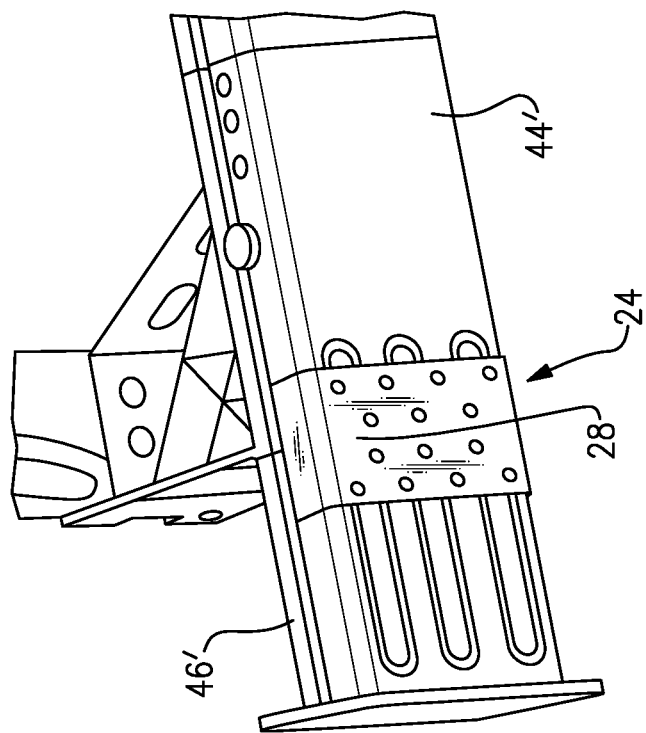
FIG. 6B is another view of the arrangement of FIG. 6A.
Figure 6A:
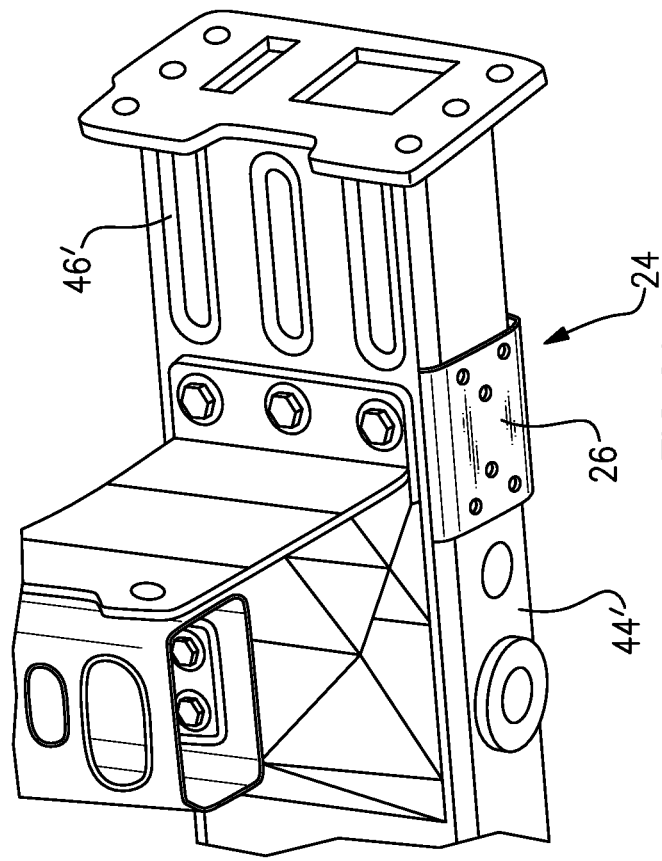
FIG. 6A is a first view of a trimmed repair sleeve relative to another original portion of a rail and another new portion of a rail.

Depending where the first and second front rails 14, 16 are cut, the repair sleeve 24 may need to be trimmed. In the example of FIGS. 6A and 6B, for example, a smaller section of first front frame rail 14 was cut, leaving certain structures of the original portion 44' intact which otherwise would interfere with the repair sleeve 24. As before, a new portion 46' is attached to the original portion 44' via the repair sleeve 24, but a portion of the repair sleeve 24 is removed to facilitate connection of the original and new portions 44', 46'. In particular, in this example, one of the first and second side walls 28, 30 is removed at a junction between that wall and the base wall 26. In particular, in this example, the second side wall 30 has been removed, leaving the repair sleeve 24 with the base wall 26, the first side wall 28, and the first section 34. While one example has been described, the repair sleeve 24 is relatively adaptable and may be trimmed in a number of ways in order to facilitate repair of the first and second front frame rails 14, 16.

It should be understood that terms such as "side," "top," "base" etc., are directional terms used for purposes of explanation only, and should not otherwise be considered to be limiting. Further, terms such as "about," "substantially," and "generally" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A repair sleeve for repairing a rail of a motor vehicle, comprising:
a base wall;
first and second side walls projecting from opposite sides of the base wall; and
a sectioned wall including a first section projecting from the first side wall and a second section projecting from the second side wall, wherein, in a pre-installed condition, the first and second sections are spaced-apart from one another such that the two side walls are moveable relative to one another.

2. The repair sleeve as recited in claim 1, wherein the base wall, first and second side walls, and sectioned wall define a cross-sectional area substantially corresponding to a cross-sectional area of the rail.

3. The repair sleeve as recited in claim 1, wherein the first and second side walls include openings for receiving fasteners.

4. The repair sleeve as recited in claim 3, wherein the base wall includes openings for receiving fasteners.

5. The repair sleeve as recited in claim 4, wherein the openings in the base wall, first side wall, and second side wall are at predefined locations.

6. The repair sleeve as recited in claim 5, wherein the base wall, first side wall, and second side wall each include a first set of openings and a second set of openings on opposite sides of a plane bisecting the base wall, first side wall, and second side wall.

7. The repair sleeve as recited in claim 6, wherein the first set of openings are at locations which correspond to the locations of second set of openings reflected about the plane, and wherein adjacent openings within the first and second sets are staggered relative to one another.

8. The repair sleeve as recited in claim 1, wherein:
the repair sleeve includes a first dimension corresponding to a length of the rail, a second dimension corresponding to the height of the rail, and a third dimension corresponding to the width of the rail, and
the second dimension is greater than the first and third dimensions.

9. The repair sleeve as recited in claim 1, wherein, when in an installed condition, the first section is closer to the second section than in the pre-installed condition.

10. The repair sleeve as recited in claim 1, wherein the repair sleeve is integrally formed as a one-piece component.

11. The repair sleeve as recited in claim 10, wherein the repair sleeve is made of aluminum.

12. The repair sleeve as recited in claim 1, wherein first and second sections are spaced-apart from one another such that the first section does not directly contact the second side wall and the second section does not directly contact the first side wall.

13. A motor vehicle, comprising:
a repair sleeve;
an original portion of a rail, wherein the original portion is a remainder of the rail after a part of the rail is removed; and
a new portion of the rail connected to the original portion via the repair sleeve, wherein the new portion is sized so as to match the removed part of the rail,
wherein the repair sleeve comprises:
 a base wall;
  first and second side walls projecting from opposite sides of the base wall; and
  a sectioned wall including a first section projecting from the first side wall and a second section projecting from the second side wall, wherein, in a pre-installed condition, the first and second sections are spaced-apart from one another such that the two side walls are moveable relative to one another.

14. The motor vehicle as recited in claim 13, wherein the base wall, first and second side walls, and sectioned wall define a cross-sectional area substantially corresponding to a cross-sectional area of the original portion and the new portion.

15. The motor vehicle as recited in claim 14, wherein:
the base wall, first side wall, and second side wall each include first and second sets of openings for receiving fasteners,
the first and second sets of openings are opposite sides of a plane bisecting the base wall, first side wall, and second side wall,
fasteners received in the first set of openings connect the repair sleeve to the original portion, and
fasteners received in the second set of openings connect the repair sleeve to the new portion.

16. The motor vehicle as recited in claim 15, wherein:
the first set of openings are at locations which correspond to the locations of second set of openings reflected about the plane, and
adjacent openings within the first and second sets of openings are staggered relative to one another.

17. A method, comprising:
connecting an original portion of a rail of a motor vehicle to a new portion of the rail with a repair sleeve, wherein the original portion is formed by removing a part of the rail, and wherein the new portion is sized to match the removed part of the rail; and
arranging the repair sleeve relative to the original portion and the new portion by deflecting a wall of the repair sleeve.

18. The method as recited in claim 17, further comprising removing a part of the repair sleeve so that the repair sleeve fits relative to the original portion and the new portion.

* * * * *